United States Patent
Seki et al.

(10) Patent No.: US 6,393,932 B1
(45) Date of Patent: May 28, 2002

(54) SHIFT LEVER DEVICE

(75) Inventors: Yoshiyuki Seki; Toshiki Nogami; Noriyuki Suzuki, all of Aichi-ken; Etsuo Shimizu, Toyota; Tatsuya Michihiro, Toyota; Yuusaku Nishimura, Toyota; Teruhisa Matsushita, Toyota, all of (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 118 days.

(21) Appl. No.: 09/635,438

(22) Filed: Aug. 11, 2000

(30) Foreign Application Priority Data

Aug. 17, 1999 (JP) .......................................... 11-230612

(51) Int. Cl.[7] .......................... B60K 17/04; B60K 17/12

(52) U.S. Cl. ...................................... 74/473.12; 74/335

(58) Field of Search ........................ 74/473.12, 473.24, 74/473.25, 473.26, 335

(56) References Cited

U.S. PATENT DOCUMENTS

| 5,713,243 | A | * | 2/1998 | Williams et al. ............... 74/475 |
| 5,791,197 | A | * | 8/1998 | Rempinski et al. ....... 74/473.18 |
| 5,868,034 | A | * | 2/1999 | McFadden .................... 74/335 |
| 6,176,809 | B1 | * | 1/2001 | Visser .......................... 477/99 |

* cited by examiner

Primary Examiner—David Fenstermacher
(74) Attorney, Agent, or Firm—Nixon Peabody LLP; Thomas W. Cole

(57) ABSTRACT

A 2-L slider supported by a shaft so as to be slidable in a predetermined range substantially in a vehicle transverse direction that, when pressed by a shift lever which is being a select-operated to an "L" position, slides toward a detent wall against an urging force of a compression coil spring. At this time, a cam portion provided at the 2-L slider presses a press receiving block provided at a shift lock plate downward. Thus, a slider which slides with the shift lock plate moves downward. A position detecting mechanism detects that the slider has moved downward. The position detecting mechanism is not a mechanism specially provided for detecting select operation to the "L" position, but a mechanism for detecting whether or not the shift lever is positioned at a "P" position. Therefore, costs can be kept down.

4 Claims, 13 Drawing Sheets

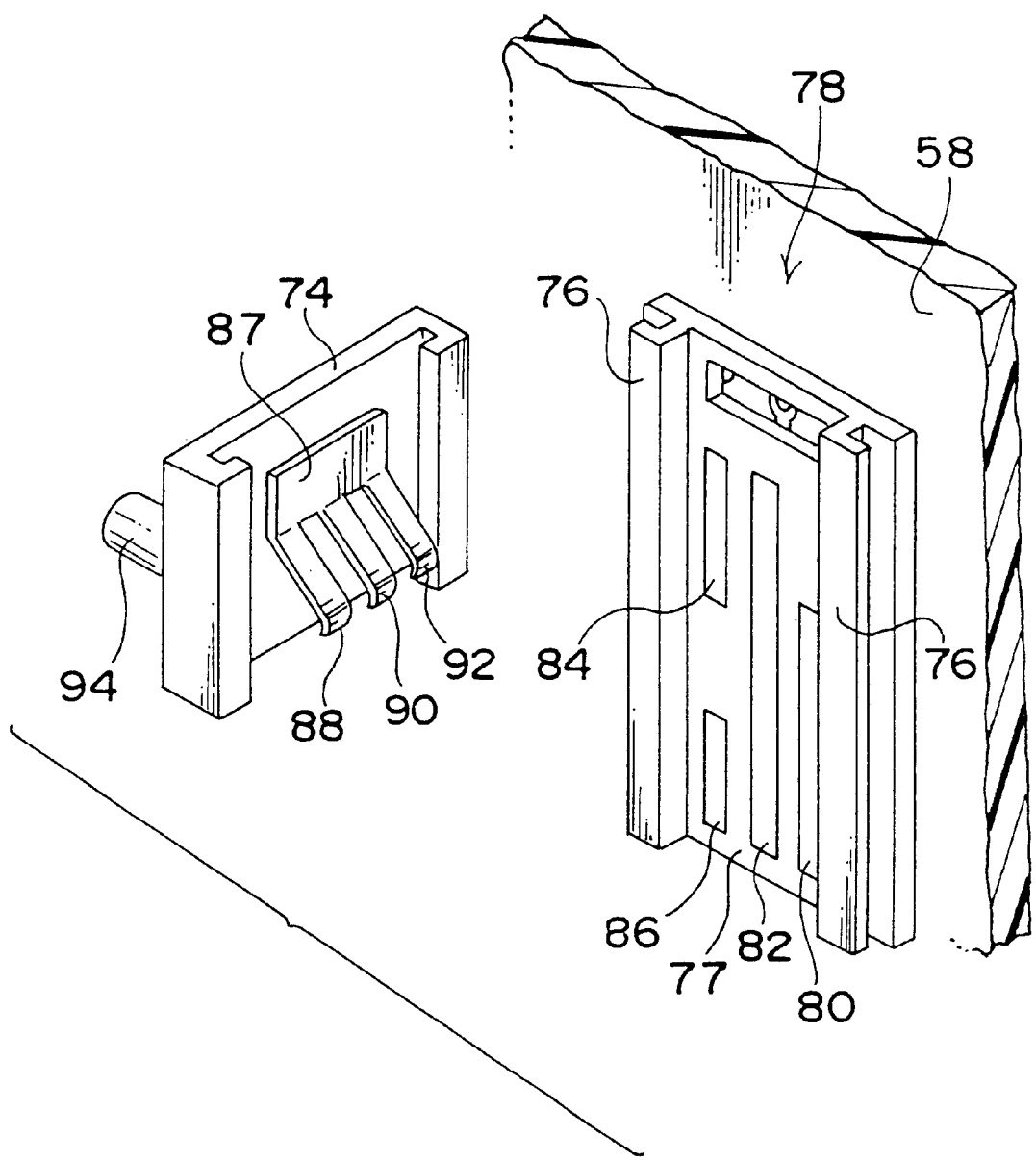
F I G. 3

F I G. 4
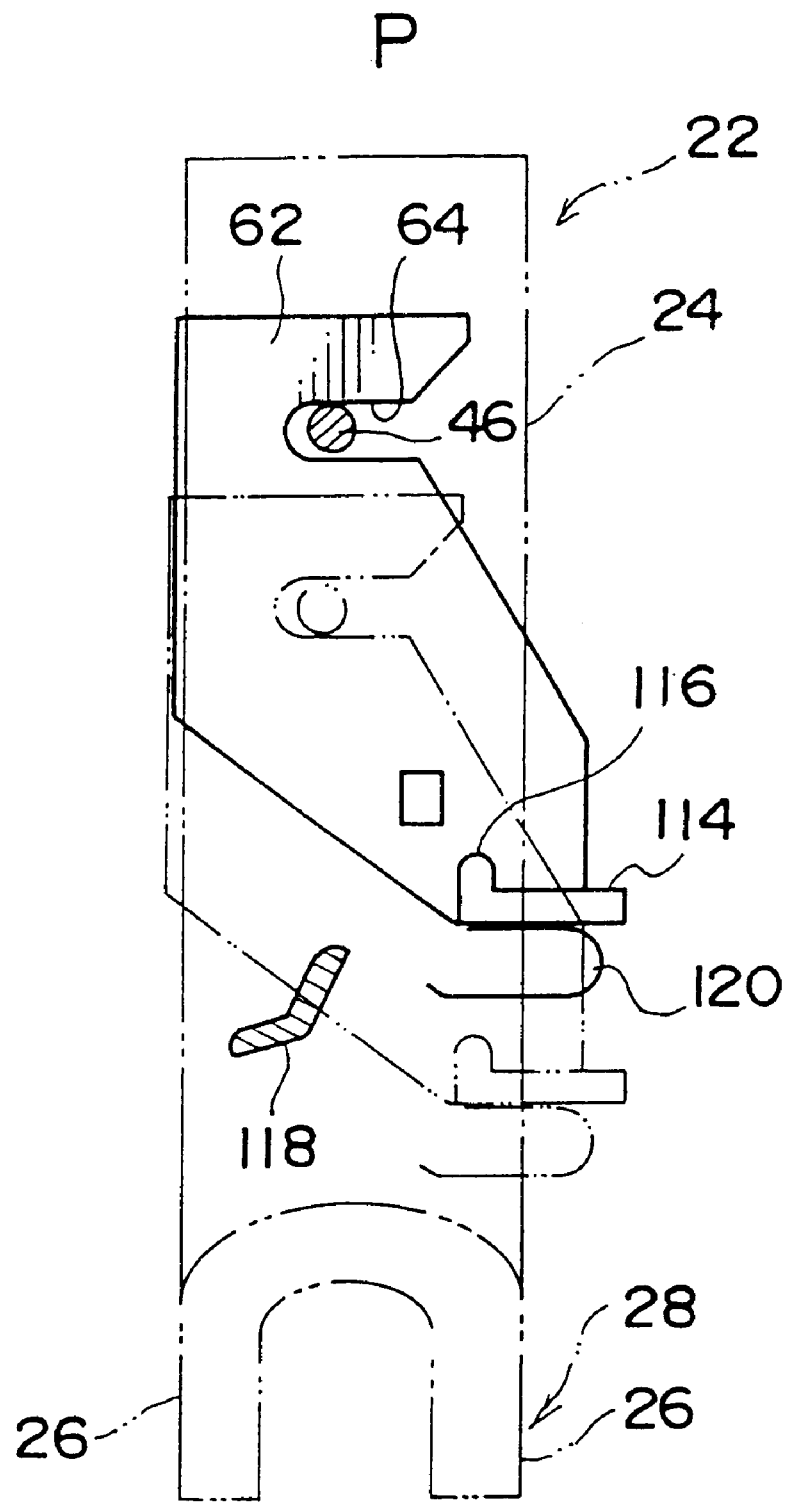

F I G. 8
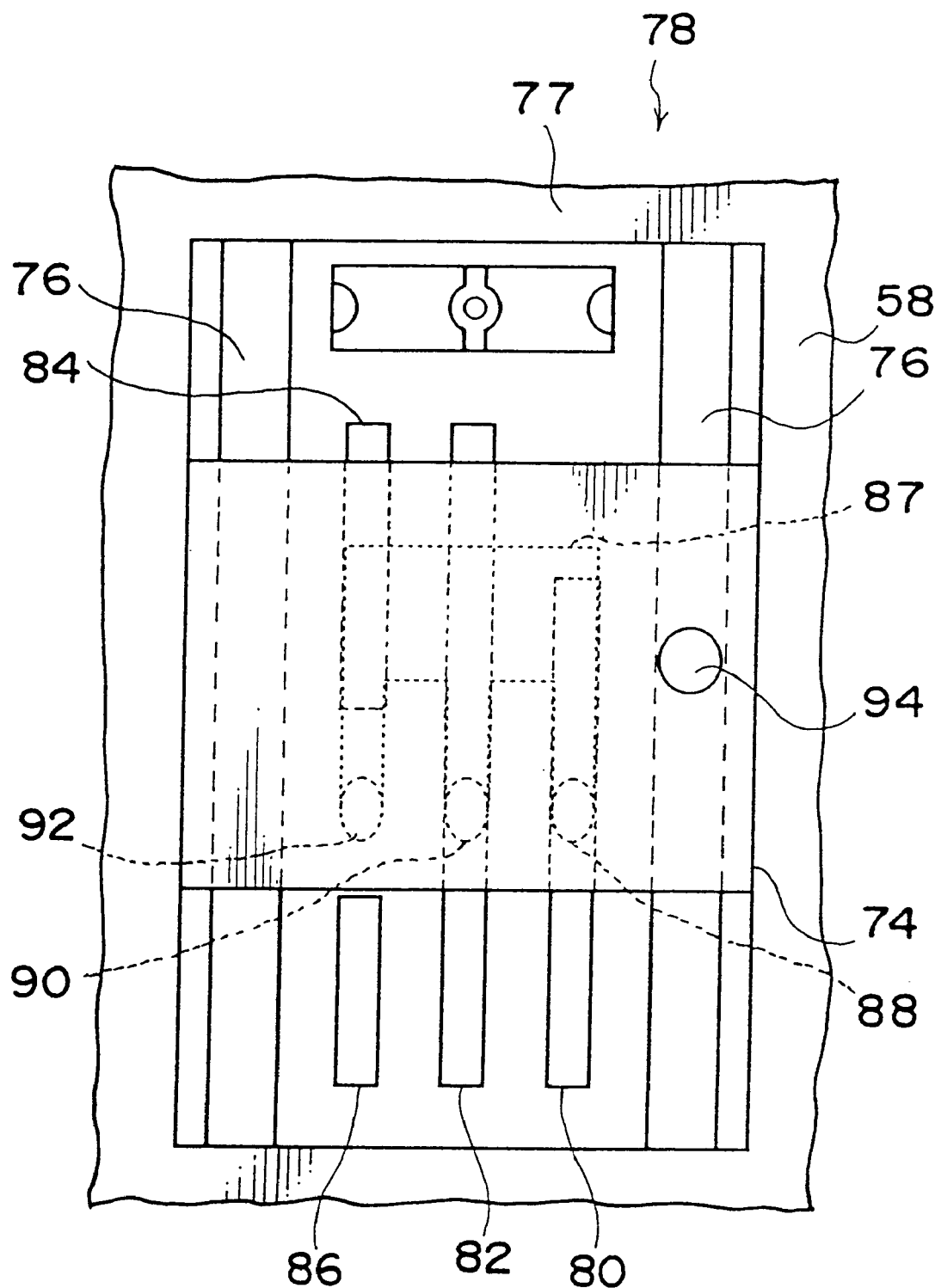

SHIFT LEVER DEVICE

BACKGROUND OF THE INVENTION

1. Field of the Invention:

The present invention relates to a shift lever device which is mounted to a vehicle for changing shift ranges in a transmission.

2. Description of the Related Art:

As a device for changing a plurality of shift ranges set in an automatic transmission of a vehicle, there is provided a shift lever device in which a shift lever, which is mechanically connected to the automatic transmission, is operated (is pivoted) select to a shift range corresponding to a pivot position (a shift position).

Among such shift lever devices, there is a so-called straight type shift lever device in which a shift lever pivots only about an axis whose direction corresponds substantially to a vehicle transverse direction (hereinafter, an operation of a shift lever about an axis which corresponds substantially to a vehicle transverse direction is referred to as a "shift operation"). There is also provided a shift lever device in which a shift lever pivots about an axis whose direction is substantially the vehicle longitudinal direction to change shift ranges further, from one end portion of a range of the above-described shift operation (hereinafter, an operation of the shift lever about an axis which corresponds substantially to the vehicle longitudinal direction is referred to as a "select operation"). In this type of shift lever device, the shift lever is moved substantially in a reversed L-shape, as seen from above. Thus, hereinafter, for convenience, this shift lever device is referred to as a "reversed substantially L-shape shift lever device" in order to distinguish it from the straight type shift lever device.

In the reversed substantially L-shape shift lever device, a shift lever and an automatic transmission are directly or indirectly connected with each other via mechanical connecting means such as wires or the like. For shift operations, the automatic transmission is operated by changes of an amount of displacement of the connecting means in accordance with changes in position of the shift lever. For a select operations, for the benefit of the automatic transmission, a microswitch is used to electrically detect a select operation of the shift lever. In accordance with results of detection, a control device such as a computer or the like operates the automatic transmission.

However, in general, the above-mentioned microswitch is expensive and the cost of the whole shift lever device may be high. Also, in addition to space required for the shift lever device, space for mounting the microswitch is needed. As a result, the device becomes larger.

SUMMARY OF THE INVENTION

In view of the aforementioned facts, an object of the present invention is to provide a compact and inexpensive shift lever device in which whether or not a select operation has been carried out can be reliably detected.

In the first aspect of the present invention, there is provided a shift lever device for use with a transmission for selecting a transmission shift range, the device comprising: a slider which is moved from a reference position to a first detection position by one of a shift operation of the shift lever to a first operation position which is at an one end portion of a range of shift operation of the shift lever, which the one end portion is opposite an other end portion of the range of shift operation, at which the other end portion the range of shift operation communicates with a range of select operation, and a shift lever action at the first operation position; a slider operating device moving to a position one of whereat the slider operating device can abut the slider or the slider operating device abuts the slider, by one of a shift operation of the shift lever to a second operation position, which is at a side of the other end portion from the first operation portion of the range of shift operation, and a shift lever action at the second operating position, and causing to move the slider via the reference position to a second detection position, by one of a select operation of the shift lever to a third operation position which is at an end portion of the range of select operation, which end portion is at a side of the range of select operation opposite to a side thereof at which the range of select operation communicated with the range of shift operation, and a shift lever action in accordance with the select operation; and a slider position detection device which detects movement of the slider to the reference positions, the first detection position and the second detection position; wherein the reference position is positioned between the first detection position and the second detection position.

In accordance with the first aspect of the present invention, firstly, when the shift lever is shift-operated to the first operation position in the shift operation range, the slider is moved from the reference position to the first detection position by the abovementioned shift operation or by a shift lever operation at the first operation position. That the slider has been moved to the first detection position is detected by the slider position detecting device. Thus, it is detected that the shift lever has been shift-operated to the first operation position.

Next, when the shift lever is shift-operated from the first operation position to the second operation position, which is at the side of intersecting portion of the shift operation range and the select operation range from the first operation position in the shift operation range, the slider operating device abuts the slider or moves to a position at which the slider operating device can abut the slider. In this state, when the shift lever is moved to the third operation position, which is the end portion of the select operation range that is opposite to the intersecting portion of the shift operation range and the select operation range, in accordance with the select operation of the shift lever, the slider operating device moves the slider from the reference position to the second detection position by moving the slider in a direction which is different from the direction from the reference position to the first detection position. That the slider has moved to the second detection position is detected by the slider position detecting device. As a result, it is detected that the shift lever has been shift-operated to the third operation position.

In this way, in the first aspect of the present invention, whether or not the shift lever has been select-operated to the third operation position by the slider position detecting device for detecting whether or not the shift lever has been shift-operated to the first operation position. Thus, costs can be extremely inexpensive.

Especially, there has been conventionally used a detecting mechanism for detecting whether or not a shift lever is positioned at a parking position, which is an operation position of the shift lever corresponding to a parking range in which wheels of a vehicle are locked, because such a detecting mechanism is necessary as part of a shift lock mechanism that locks the shift lever at the parking position. Thus, when the first aspect of the present invention is set up such that the first operation position is the parking position, it is possible to detect that the shift lever is moved to the third operation position using a part of the structure that is necessary for the shift lock mechanism. As a result, costs required for the shift lever device can be further reduced.

In the second aspect of the present invention, the shift lever device in accordance with the first aspect of the present invention further comprises: a detent member which moves with the shift lever in accordance with the shift operation and the select operation of the shift lever, which is displaced relative to the shift lever from a restriction position to a restriction releasing position in a longitudinal direction of the shift lever by a predetermined releasing operation, and which engages with the slider one of directly or indirectly in a state in which the shift lever is positioned at the first operation position so as to move the slider from the reference position to the first detection position in accordance with a movement of the detent member from the restriction releasing position to the restriction position; a restricting portion, in a state in which the shift lever is positioned at the first operation position and the detent member is positioned at the restriction position, opposing the detent member along a direction of the shift operation from the first operation position, and which does not oppose the detent member when the detent member is at the restriction releasing position; and a shift lock device which is provided on a locus of movement of the slider from the first detection position to the reference position, and which restricts a movement of the slider from the first detection position to the reference position, and which is removed from the locus of movement of the slider under predetermined releasing conditions.

In accordance with the second aspect of the present invention, when the shift lever is shift-operated to the first operation position, the detent member directly or indirectly engages with the slider. In this state, when the detent member is moved from the restriction releasing position to the restriction position, the slider is moved from the reference position to the first detection position together with the detent member.

In the above-described state, the detent member faces the restricting portion along the direction of the shift operation of the shift lever from the first operation position. Thus, if the shift lever starts to be shift-operated, the detent member abuts the restricting portion. Thus, the shift operation of the shift lever is indirectly restricted.

A state in which the detent member faces the restricting portion along the direction of -the shift operation is released by releasing operation, namely, by moving the detent member from the restriction position to the restriction releasing position. Thus, in this state, the shift operation of the shift lever from the first operation position is possible. However, movement of the slider from the first detection position is restricted by the shift lock device provided on the locus of movement of the slider from the first detection position to the reference position. Therefore, the detent member cannot be moved to the restriction releasing position and the shift lever cannot be shift-operated.

The shift lock device is removed from the locus of movement of the slider under predetermined conditions, such as when a braking device of the vehicle is operated or the like. In this state, the slider can be moved from the first detection position to the reference position. Further, the detent member can be moved to the restriction releasing position.

As described above, in the second aspect of the present invention, the shift operation of the shift lever from the first operation position is restricted until predetermined releasing operations and conditions are satisfied. Therefore, careless shift operation of the shift lever can be prevented.

In the second aspect of the present invention, the slider forms a part of the restricting mechanism of the shift lever which has been described above and therefore the device can be made compact. Further, costs can be inexpensive.

In the third aspect of the present invention, the shift lever device in accordance with the first or the second aspect of the present invention further comprises: a slider operating member which is moved in a direction of the select operation by being pressed by the shift lever during the select operation, and which, in accordance with movement in the direction of the select operation direction, applies a pressing force to the slider one of directly or indirectly to thereby move the slider to the second detection position.

In accordance with the third aspect of the present invention, when the shift lever is select-operated, the slider operating member which forms the slider operating device is pressed by the shift lever and moved in the select operation direction. Further, the slider operating member which has moved in the select operation direction directly or indirectly presses and moves the slider to the second detection position. Thus, the slider position detecting device detects that the slider has moved to the second detection position, and it is detected that the shift lever has been select-operated to the third operation position.

In the third aspect of the present invention, a direction of movement of the slider operating member in accordance with the select operation of the shift lever is the select operation direction. However, a direction of movement of the slider pressed by the slider operating member which moves in the select operation direction need not be the select operation direction.

In the fourth aspect of the present invention, the shift lever device in accordance with the third aspect of the present invention further comprises: a link member provided such that a distal end portion thereof corresponds to the slider and a proximal end vicinity portion thereof corresponds to the slider operating member, and which is pivoted about a proximal end portion of the link member by a pressing force applied to the slider operating member and which thereby presses the slider with the distal end portion to thereby move the slider to the second detection position.

In accordance with the fourth aspect of the present invention, when the shift lever is select-operated, the slider operating member which forms the slider operating device is pressed by the shift lever and moved in the select operation direction. Further, the slider operating member, which has moved in the select operation direction, presses the proximal end vicinity portion of the link member which also forms the slider operating device together with the slider operation member so as to pivot the link member about the proximal end portion thereof. The distal end portion of the link member presses the slider when the link member pivots, and moves the slider to the second detection position.

Accordingly, the slider position detecting device detects that the slider has been moved to the second detection position. As a result, it is detected that the shift lever has been select-operated to the third operation position.

Here, when an object pivots, an amount of displacement of the object in the pivoting direction at a distal end portion thereof is larger than that the same at a proximal vicinity end portion thereof. Accordingly, the slider can be moved further than a moving distance of the slider in a case in which a slider operating member which moves in the select operating direction moves the slider directly. As a result, it is possible to more accurately detect whether or not the shift lever has been select-operated to the third operation position (i.e., the detecting accuracy of whether or not the shift lever has been select-operated to the third operation position is enhanced).

BRIEF DESCRIPTION OF THE DRAWINGS

FIG. 3 is an enlarged perspective view illustrating the structure of a position detecting mechanism which serves as a slider position detecting means.

FIG. 4 is a schematic view illustrating a positional relationship between a shift lever and a shift lock plate in a state in which a shift lever is positioned at a "P" position.

FIG. 8 is a view illustrating a state in which a slider is positioned at a reference position.

DESCRIPTION OF THE PREFERRED EMBODIMENTS

Structure of First Embodiment

Figure 1:
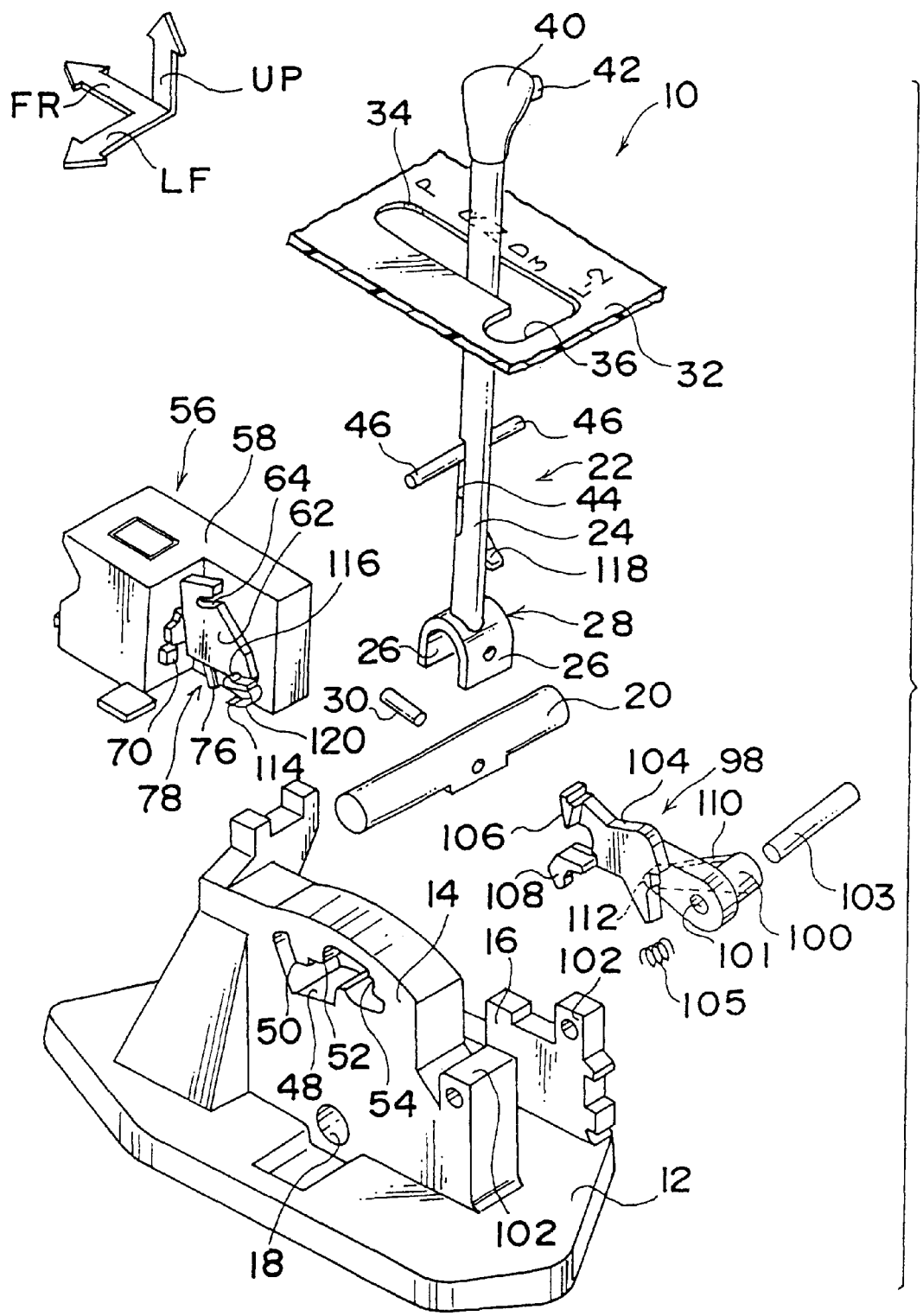
FIG. 1 is an exploded view illustrating the overall structure of a shift lever device relating to a first embodiment of the present invention.

FIG. 1 shows an exploded perspective view of a shift lever device 10 relating to a first embodiment of the present invention. Hereinafter, members which are not denoted by reference numerals are not illustrated. As shown in FIG. 1, the shift lever device 10 has a base 12. The base 12 is fixed to a vehicle body by a fastening means such as bolts or the like, under a floor portion between a driver's seat of the vehicle and a front passenger's seat. A detent wall 14 stands upright at one side of the base 12 in a vehicle transverse direction. A supporting wall 16 stands upright at another transverse direction side of the base 12 so as to face the detent wall 14.

Bearing holes 18 are coaxially formed at lower end sides of the detent wall 14 and the supporting wall 16 (in FIG. 1, only the bearing hole 18 formed at the detent wall 14 is shown). A supporting shaft 20 passes through the bearing holes 18 and is rotatably supported by the bearing holes 18 with its axial direction being substantially along the vehicle transverse direction.

A lever main body 24 which forms a shift lever 22 is mounted at a longitudinal direction intermediate portion of the supporting shaft 20. The lever main body 24 is formed in a cylindrical shape and a longitudinal direction thereof is substantially along a vehicle vertical direction. A mounting portion 28, which is formed by a pair of wall portions 26 which face each other in a direction perpendicular to the axial direction (the longitudinal direction) of the supporting shaft 20, is formed at a lower end portion of the lever main body 24. The pair of wall portions 26 are disposed so as to embrace the supporting shaft 20. The mounting portion 28 (the lever main body 24) is rotatably supported about a shaft 30 which passes through the wall portions 26 and the supporting shaft 20 in a direction perpendicular to the axial direction of the supporting shaft 20. That is, the lever main body 24 can rotate about the shaft 30, whose axial direction is substantially along a vehicle longitudinal direction and, being connected to the supporting shaft 20, can rotate about the supporting shaft 20, whose axial direction is substantially along the vehicle transverse direction.

An upper end portion of the lever main body 24 passes through a housing 32 provided between the driver's seat and the front passenger's seat and extends toward an interior of the vehicle. A shift hole 34, whose longitudinal direction is substantially along the vehicle longitudinal direction and whose width size is larger than an outer diameter of the lever main body 24, is formed in the housing 32. The lever main body 24 passes through the shift hole 34. An end portion of the shift hole 34 substantially at a vehicle rearward side thereof communicates with an end portion of a select hole 36 substantially at a vehicle right-hand side thereof. The select hole 36 is formed such that the longitudinal direction thereof is substantially along the vehicle transverse direction and the width thereof is larger than the outer diameter of the lever main body 24. The lever main body 24 can move along the shift hole 34 and the select hole 36 so as to move substantially in a reversed L shape. Movements other than the reversed L-shaped movement are restricted by inner peripheral portions of the shift hole 34 and the select hole 36.

Characters "P", "R", "N", "D", "3" and "L-2" are formed along the shift hole 34 on a surface of the housing 32. These characters represent shift ranges of an automatic transmission (not shown) to which the lever main body 24 is connected via mechanical connections such as wires or the like (not shown). When the lever main body 24 is moved beside a character, the automatic transmission is changed to a respective shift range corresponding to that character. With regard to "L-2", which is formed at a side portion of the substantially vehicle rearward end portion of the shift hole 34, when the lever main body 24 is moved to the vehicle right-hand end portion of the select hole 36, the automatic transmission is changed to a shift range corresponding to "2". When the lever main body 24 is moved to the vehicle left-hand end portion of the select hole 36, the automatic transmission is changed to a shift range corresponding to "L". "P" corresponds to a parking range in which transmission of driving force of an engine to wheels is cut off and the wheels are locked. "2" refers to a second range, in which an upper limit of engine speeds at which a low gear or a second gear is used is higher than an upper limit of engine speeds at which the low gear or the second gear is used when "D" is selected. Further, "L" refer to means a low range in which an engine speed upper limit for the low gear is higher than the engine speed upper limit for the low gear when "2" is selected.

Hereinafter, for convenience, a position of the lever main body 24 (the shift lever 22) beside "P" is referred to as the "P position"(a first operation position). Similarly, other positions are referred to as an "R position", a "N position", a "D position", a "3 position", a "2 position" (a second operation position) and a "L position"(a third operation position).

A knob 40 which is a grip for operation is fixed to an upper end portion of the lever main body 24. The knob 40 is provided with a knob button 42 which protrudes substantially toward the vehicle right-hand direction side. The knob button 42 engages, within the knob 40, with an upper end portion of a bar-shaped detent rod (not shown) which is disposed within the lever main body 24 and the knob 40 so as to slide along the longitudinal direction of the lever main body 24. When the knob button 42 is press ed toward the interior of the knob 40, the detent rod is pushed down substantially in the vehicle downward direction. When the pressing force upon the knob button 42 is released, the knob 40 and the detent rod are returned to positions for when the knob button 42 is not pressed by urging means such as compression coil springs provided within the lever main body 24 and the knob 40.

A pair of elongated holes 44, each of whose longitudinal direction corresponds to the longitudinal direction of the lever main body 24, is formed at outer circumferential portions of the lever main body (in FIG. 1, only one elongated hole 44 is shown). Detent pins 46, which serve as detent members, protrude from the elongated holes 44 toward the detent wall 14 and the supporting wall 16. A proximal end portion of each detent pin 46 is fixed to the above-mentioned detent rod. Each detent pin 46 integrally moves in the vertical direction in accordance with vertical movement of the detent rod when pressing force to the knob button 42 is applied or released. A distal end portion of one of the detent pins 46 enters into a detent hole 48 formed at the detent wall 14. The detent hole 48 is an opening or a through hole which is large enough that the one detent pin 46 can move within the detent hole 48 when the lever main body 24 moves along the shift hole 34 when the detent pins 46 are positioned at the upper end side or at the lower end side of the elongated holes 44. A plurality of restricting portions 50, 52 and 54 are formed at an upper end portion of the detent hole 48.

The restricting portion 50 is formed so as to correspond to a locus of movement of the detent pins 46 when the lever main body 24 moves between the P position, which is the first operation position, and the R position. When the detent pins 46 are positioned at the upper end side of the elongated holes 44, the restricting portion 50 faces the one detent pin 46 and restricts movement thereof in accordance with movement of the lever main body 24 along the shift hole 34.

The restricting portion 52 is formed so as to correspond to a locus of movement of the detent pins 46 when the lever main body 24 moves between the R position and the N position. When the detent pins 46 are positioned at the upper end side of the elongated hole 44, the restricting portion 52 faces the one detent pin 46 and restricts movement thereof in accordance with movement of the lever main body 24 along the shift hole 34.

Further, the restricting portion 54 is formed so as to correspond to a locus of movement of the detent pins 46 when the lever main body 24 moves between the 3 position and the 2 position, which is the second operation position. When the detent pins 46 are positioned at the upper end side of the elongated hole 44, the restricting portion 54 faces the one detent pin 46 and restricts movement thereof in accordance with of the lever main body 24 along the shift hole 34.

Structure of Shift Lock Unit 56

Figure 2:
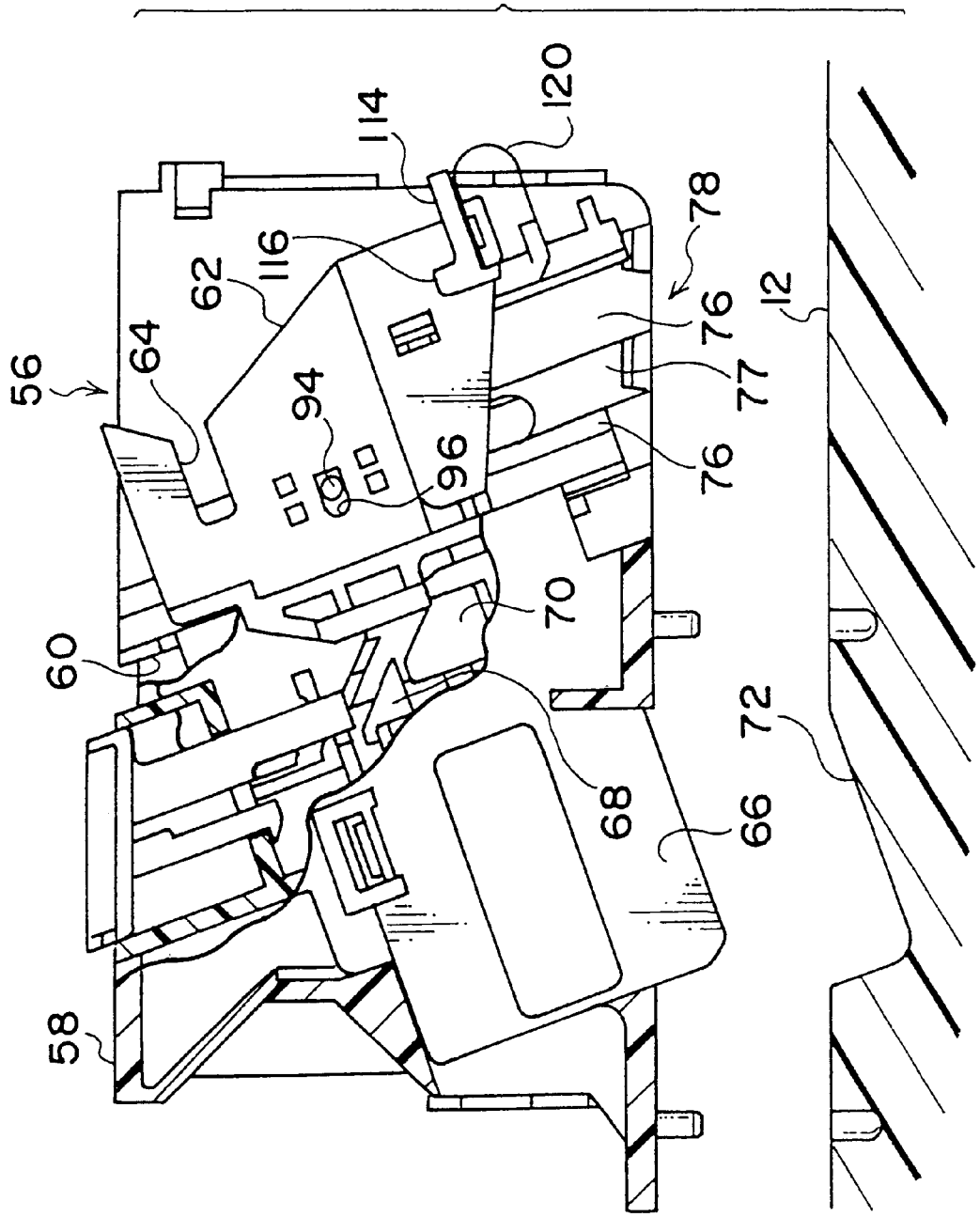
FIG. 2 is a partially cutaway, enlarged elevational view of a shift lock unit which serves as a shift lock means.

A shift lock unit 56, which serves as a shift lock device, is mounted on the base 12 at a front side of the supporting wall 16. FIG. 2 shows an elevational view of the shift lock unit 56, which view is enlarged and partially cut away. As illustrated in FIG. 2, a mounting portion 72, which is a concave portion whose cross section is formed in an inverted triangle shape, is formed in the base 12. A shift lock solenoid 66 which will be described later is mounted to the mounting portion 72 and tilted such that a rear end of the shift lock solenoid 66 is higher than a front end thereof. A guide portion 60 is formed in a housing 58 and tilted from a vehicle top portion to a vehicle bottom and rearward portion. The longitudinal direction of the guide portoin 60 is the tilting direction. A shift lock plate 62 is slidably supported by the guide portion 60. The shift lock plate 62 is formed as a whole in a substantially plate shape. A cutout portion 64 is formed at the shift lock plate 62, which cutout portion opens substantially in a vehicle rearward and upward direction when the shift lock plate 62 is supported by the guide portion 60.

The width of the cutout portion 64 is slightly larger than the outer diameter of the detent pins 46. When the shift lever 22 is moved to the P position, the other detent pin 46, which protrudes to the supporting wall 16 side, enters the cutout portion 64. The shift lock solenoid 66 is disposed substantially at the vehicle front side of the shift lock plate 62.

The shift lock solenoid 66 includes a plunger 68 and a stopper 70. Respective one ends of the plunger 68 and stopper 70 protrude outside the housing 58. The plunger 68 and the stopper 70 can slide in a direction parallel to the tilting direction of the above-mentioned cutout portion 64.

A pair of compression coil springs (not shown) which exert different urging forces with each other and an electromagnetic solenoid (not shown) which is excited when electricity is applied thereto are accommodated in the housing 58. The electromagnetic solenoid is provided integrally with the above-mentioned stopper 70 and slidably moves along with the stopper 70. One of the compression coil springs urges the electromagnetic solenoid, and thus the stopper 70, in the direction of protrusion. One end of another of the compression coil springs is attached to the electromagnetic solenoid and the other end of the same is attached to the plunger 68. Thus, the other compression coil spring urges the plunger 68 to protrude relative to the electromagnetic solenoid. The urging force of the other compression coil spring is less than that of the one compression coil spring. Thus, in a usual state (when electricity is not applied), even if the plunger 68 is pressed into the housing 58, only the plunger 68 is pressed in and the stopper 70 does not move with the plunger 68. However, when electricity is applied to the electromagnetic solenoid, the combined force of a repulsive force between the electromagnetic solenoid and the plunger 68 and the urging force of the other compression coil spring exceeds the urging force of the one compression coil spring. As a result, when the plunger 68 is pressed, the stopper 70 moves into the housing 58 together with the plunger 68.

The distal ends of the plunger 68 and the stopper 70 are positioned on a locus of slide movement of the shift lock plate 62. When the shift lock plate 62 moves downward, it presses a tilted surface of a distal end portion of the plunger 68 so as to forcibly press the plunger 68 into the housing 58. Here, if electricity is not applied to the electromagnetic solenoid, the stopper 70 on the locus of sliding movement of the shift lock plate 62 restricts the slide movement of the shift lock plate 62. If electricity is applied to the electromagnetic solenoid, the stopper 70 is pressed into the housing 58 together with the plunger 68 and removed from the locus of slide movement of the shift lock plate 62. As a result, restriction of the slide movement of the shift lock plate 62 is removed.

Structure of Position Detecting Mechanism 78

As shown in FIGS. 1 and 2, a guide plate 77 which forms a position detecting mechanism 78 is provided. The position detecting mechanism 78 serves as a slider position detection device which is fixed to the wall portion of the housing 58, at the thickness direction shift lock plate 62 side of the housing 58. As illustrated in FIG. 3, a pair of guide rails 76, whose longitudinal direction is substantially the sliding direction of the shift lock plate 62, are formed in parallel at both sides of the guide plate 77 in the width direction thereof. A slider 74 is slidably engaged along the guide rails 76.

A plurality of fixed contacts 80, 82, 84 and 86, (four fixed contacts in the present embodiment), which are formed in narrow band shapes and are parallel to the guide rails 76, are provided between the guide rails 76.

The fixed contact 80 is provided so as to be adjacent to one of the guide rails 76. The fixed contact 82 is disposed at a side of the fixed contact 80 opposite the side at which one of the guide rails 76 is provided. The fixed contact 82 is provided so as to be parallel to the fixed contact 80. The fixed contact 82 is longer than the fixed contact 80. Respective lower end portions of the fixed contact 82 and the fixed contact 80 are at the same heightwise position along the longitudinal direction of the guide plate 77. An upper end portion of the fixed contact 82 is positioned higher than that of the fixed contact 80.

The fixed contact 84 is provided at a side of the fixed contact 82 opposite the side thereof at which the fixed contact 80 is provided, and is parallel to the fixed contact 82. The fixed contact 84 is shorter than the fixed contacts 80 and 82. Upper end portions of the fixed contact 84 and the fixed contact 82 are substantially at the same heightwise position along the longitudinal direction of the guide plate 77. A lower end portion of the fixed contact 84 is positioned at the same level in the longitudinal direction of the guide plate 77 as an intermediate portion of the fixed contact 82, and is slightly lower than the upper end portion of the fixed contact 80.

The fixed contact 86 is provided at the side of the fixed contact 82 opposite the side thereof at which the fixed contact 80 is provided, and is provided below the fixed contact 84. The fixed contact 86 is also shorter than the fixed contacts 80 and 82. A lower end portion of the fixed contact 86 is positioned substantially at the same level as the lower end portion of the fixed contact 82. An upper end portion of the fixed contact 86 is below the lower end portion of the fixed contact 84 and is positioned at the same level as a longitudinal direction intermediate portion of the fixed contact 80.

Slide contacts 88, 90 and 92 are provided at the slider 74 so as to correspond to the fixed contacts 80, 82, 84 and 86. The slide contacts 88, 90 and 92 are plate springs extending from a plate-shaped connecting portion 87 attached to the slider 74 at a side thereof which faces the fixed contacts 80, 82, 84 and 86. A distal end portion of the slide contact 88 slides along and beyond the fixed contact 80 in the longitudinal direction in accordance with slide movements of the slider 74. A distal end portion of the slide contact 90 slides on the fixed contact 82 in accordance with slide movements of the slider 74. A distal end portion of the slide contact 92 slides along and beyond the fixed contacts 84 and 86, in the longitudinal direction thereof in accordance with slide movements f the slider 74.

The above-described fixed contacts 80, 82, 84 and 86 are electrically connected to a control means such as a control circuit, a computer or the like via unillustrated wiring (including printed wiring). Thus, which of the fixed contacts 80, 84 and 86 are connected with the fixed contact 82, via the slide contacts 88, 90 and 92 and a connecting portion 87, is mounted.

As illustrated in FIG. 3, a pin 94 is formed at the slider 74 so as to protrude to a shift lock plate 62 side thereof. The pin 94 engages with an elongated hole 96 (see FIG. 2) formed at the shift lock plate 62. Accordingly, the slider 74 slides in accordance with sliding of the shift lock plate 62 along the guide portion 60.

Structure of 2-L Slider 98

As illustrated in FIG. 1, a 2-L slider 98 which is a slider operating device is disposed substantially at the vehicle rearward side of the supporting shaft 20. The 2-L slider 98 includes a connecting portion 100. The connecting portion 100 is formed in a cylindrical shape with an axial direction substantially along the vehicle transverse direction. A shaft 103 is inserted into a through hole 101 which penetrates the connecting portion 100 in the axial direction thereof. End portions of the shaft 103 are fixed to supporting portions 102 which are formed at the detent wall 14 and the support wall 16, respectively. The connecting portion 100, i.e., the 2-L slider 98, can slide within a predetermined range along the shaft 103 substantially in the vehicle transverse direction.

A compression coil spring 105 is mounted to the shaft 103. The compression coil spring 105 is disposed between the connecting portion 100 of the 2-L slider 98 and the detent wall 14 so as to urge the connecting portion 100 toward the supporting wall 16 side.

A restricting lever 104 extends from the detent wall 14 side of the connecting portion 100 substantially toward the vehicle front. A restricting portion 106, whose thickness in the vehicle transverse direction is larger than that of the restricting lever 104 and which faces the above-described restricting portion 54, is provided at a distal end portion of the restricting lever 104. The size of the restricting lever 104 in the vehicle transverse direction is slightly smaller than a clearance between the detent wall 14 and the lever main body 24 when the supporting shaft 20 is mounted to the detent wall 14 and the supporting wall 16. When the supporting shaft 20 is shift-operated to the 2 position, the lever main body 24 is disposed at a side of the restricting portion 106 opposite a side thereof at which the restricting portion 54 is provided. In this state, when a select operation along the select hole 36 to the L position is initiated, the restricting portion 106 abuts the lever main body 24 to restrict the select movement of the lever main body 24 (rotation about the shaft 30) toward the vehicle left-hand side.

A plate-form releasing portion 108, whose direction of thickness is substantially along the vehicle vertical direction, is provided below the restricting portion 106. The releasing portion 108 is positioned below the one detent pin 46, which protrudes to the detent wall 14 side, when the shift lever 22 has been shift-operated to the 2 position. When the one detent pin 46 moves towards the lower end of the elongated hole 44, the one detent pin 46 abuts the releasing portion 108 and presses the releasing portion 108 downward. An end portion of the releasing portion 108 substantially at the vehicle rearward side thereof is integrally connected to the restricting lever 104. When the releasing portion 108 is pressed downward by the one detent pin 46, the restricting lever 104 pivots around the connecting portion 100 with an axial direction of pivoting being substantially the vehicle transverse direction. As a result, the restricting portion 106 faces the detent hole 48 substantially in the vehicle transverse direction. Thus, in this state, if the restricting portion 106 is pressed substantially in the vehicle left-hand direction by the lever main body 24, the restricting portion 106 enters within the detent hole 48.

An operation lever 110 protrudes from the supporting wall 16 side of the connecting portion 100 substantially toward the vehicle front. A distal end portion of the operation lever 110 is a cam portion 112 which has a tilted surface which faces substantially toward the vehicle left-hand side and downward. The cam portion 112 corresponds to a pressed block 114 (see FIGS. 1 and 2) formed at a lower end portion of the shift lock plate 62. The pressed block 114 can come into contact with the cam portion 112 when the shift lock plate 62 is positioned at a predetermined slide position along the guide portion 60. Then, when the operation lever 110 slides along parallel to the shaft 103, the cam portion 112 presses the pressed block 114.

As shown in FIGS. 1 and 2, a convex portion 116 is formed at an end portion of the pressed block 114 substantially at the vehicle front side so as to protrude substantially in the vehicle upward direction. As illustrated in FIG. 1, a press cam 118 is formed at the lever main body 24 of the shift lever 22 so as to correspond to the convex portion 116. The press cam 118 is a plate-like protrusion which is formed substantially in a V-shape, as seen from a side thereof. The press cam 118 is brought into contact with the convex portion 116 by movement of the press cam 118 in accordance with rotation of the lever main body 24 to the 2 position, and presses the convex portion 116 downward. Thus, the pressed block 114 is moved so as to be abuttable by the cam portion 112 of the operation lever 110.

A plate spring 120, whose direction of thickness corresponds substantially to the vehicle vertical direction, is attached at a lower surface of the pressed block 114. An intermediate portion of the plate spring 120 is bent into substantial U-shape extending substantially toward the vehicle front with the intermediate portion disposed substantially at the vehicle rear side of the plate spring 120. When the plate spring is bent by an external force from the vehicle lower side, the plate spring 120 generates a shape-restoring force.

Operations and Effects of First Embodiment

Next, a description will be given of operation and effects of the first embodiment.

A vehicle occupant grips a knob 40 of the shift lever device 10 to shift-operate the shift lever 22 substantially in the vehicle longitudinal direction along the shift hole 34 and to select-operate the shift lever 22 substantially in the vehicle transverse direction along the select hole 36 so as to move the shift lever 22 to one of the P position, the R position, the N position, the D position, the 3 position, the 2 position and the L position. As a result, it is possible to change to a shift range, among a plurality of shift ranges set in an automatic transmission, corresponding to one of the characters beside the lever main body 24.

Here, when the shift lever 22 starts to be shift-operated from the P position to the R position or from the R position to the P position with the detent pins 46 positioned at the upper end sides of the elongated holes 44, the restricting portion 50 abuts the one detent pin 46 and restricts the shift operation of the shift lever 22 via the one detent pin 46.

When the shift lever 22 starts to be shift-operated from the N position to the R position with the detent pins 46 positioned at the upper end sides of the elongated holes 44, the restricting portion 52 abuts the one detent pin 46 and restricts the shift operation of the shift lever 22 via the one detent pin 46. Further, when the shift lever 22 starts to be shift-operated from the 3 position to the 2 position with the detent pins 46 positioned at the upper end sides of the elongated holes 44, the restricting portion 54 abuts the one detent pin 46 and restricts the shift operation of the shift lever 22 via the one detent pin 46.

Of the above-described restrictions of shift operations, the restriction by the restricting portion 52 can be released without a need for special operations because of the shape of the restricting portion 52. In contrast, when a shift operation is restricted by one of the restricting portions 50 and 54, restriction of shift operation by the one of the restricting portions 50 and 54 is removed by moving the detent pins 46 to a position in which the one detent pin 46 does not abut the one of the restriction portions 50 and 54. That is, when the knob button 42 is pressed in the above-described restricted state and a detent rod within the lever main body 24 is moved downward against urging forces from urging means provided within the knob 40 and the lever main body 24, the detent pins 46 move toward the lower ends of the elongated holes 44. In this state, a locus of movement of the one detent pin 46 at the detent wall 14 side corresponding to shift operation of the shift lever 22 is below the restricting portions 50 and 54. Therefore, the one detent pin 46 can move avoiding the one of the restricting portions 50 and 54.

As illustrated in FIG. 4, when the shift lever 22 is shift-operated to the P position, the other detent pin 46 at a supporting wall 16 side enters the cutout portion 64 of the shift lock plate 62 (a state shown by dashed lines in FIG. 4). As described above, when the shift lever is shift-operated to the P position, the detent pins 46 have been moved toward the lower ends of the elongated holes 44 so as to avoid the restricting portion 50. Accordingly, if the shift lever 22 is shift-operated to the P position and then pressing force on the knob button 42 is released such that the detent rod within the lever main body 24 is moved upwards by the urging force of the urging means within the lever main body 24, the detent pins 46 are moved toward the upper ends of the elongated holes 44, and the other detent pin 46 at the supporting wall 16 side, which has entered into the cutout portion 64, presses an inner wall of the cutout portion 64 upward. Thus, the shift lock plate 62 slides upwar, guided by the guide portion 60 (to a state shown by a solid line in FIG. 4).

A distal end of the stopper 70 previously abutted the shift lock plate 62, thereby limiting protrusion of the plunger 68, which protrusion is due to an urging force. When the shift lock plate 62 slides upward, the plunger 68 of the shift lock solenoid 66 protrudes and the stopper 70 is disposed on a locus of downward sliding of the shift lock plate 62.

Figure 9:
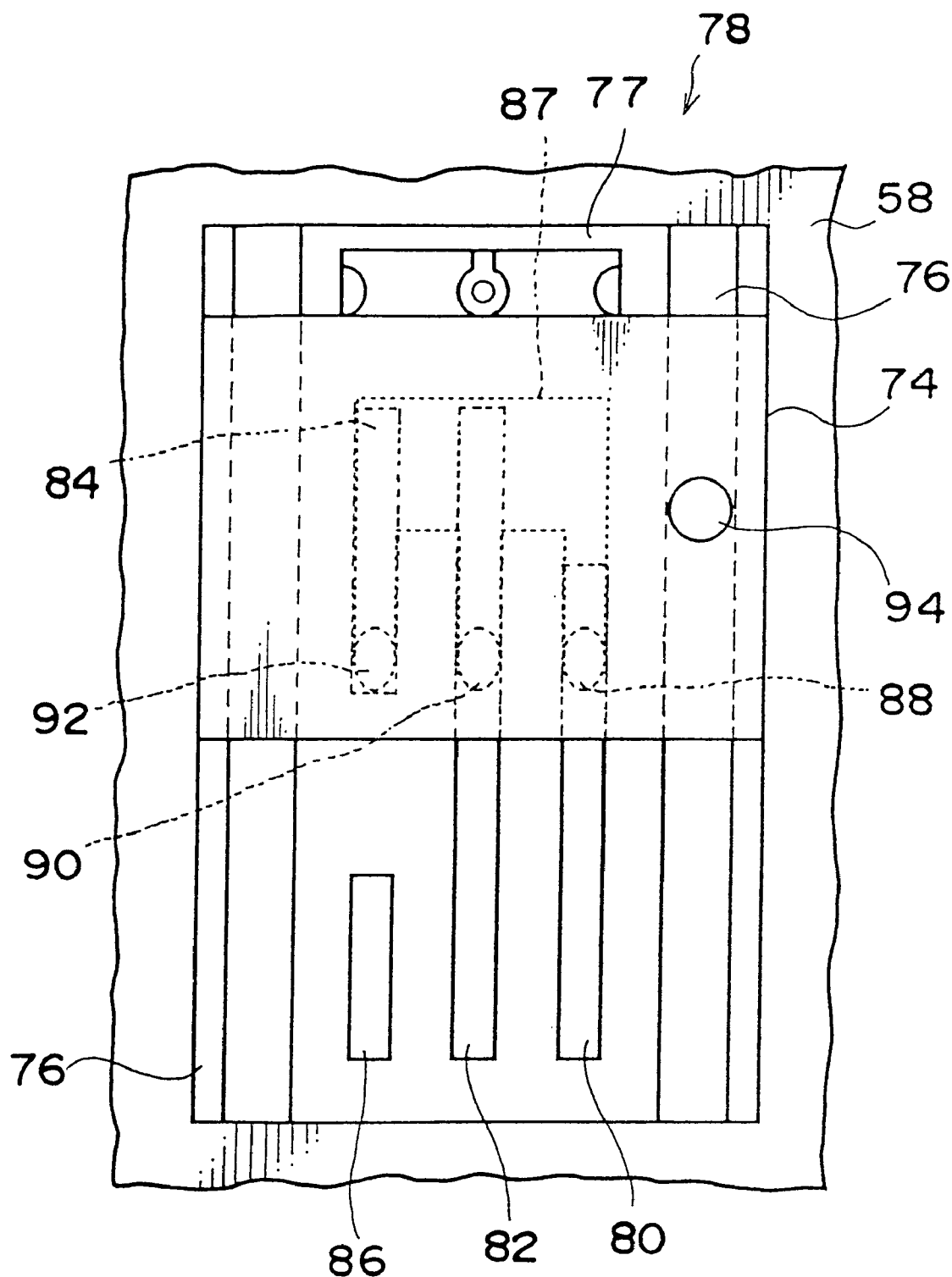
FIG. 9 is a view corresponding to FIG. 8 and illustrating a state in which the slider is moved toward a first detection position side from the reference position.
Figure 10:
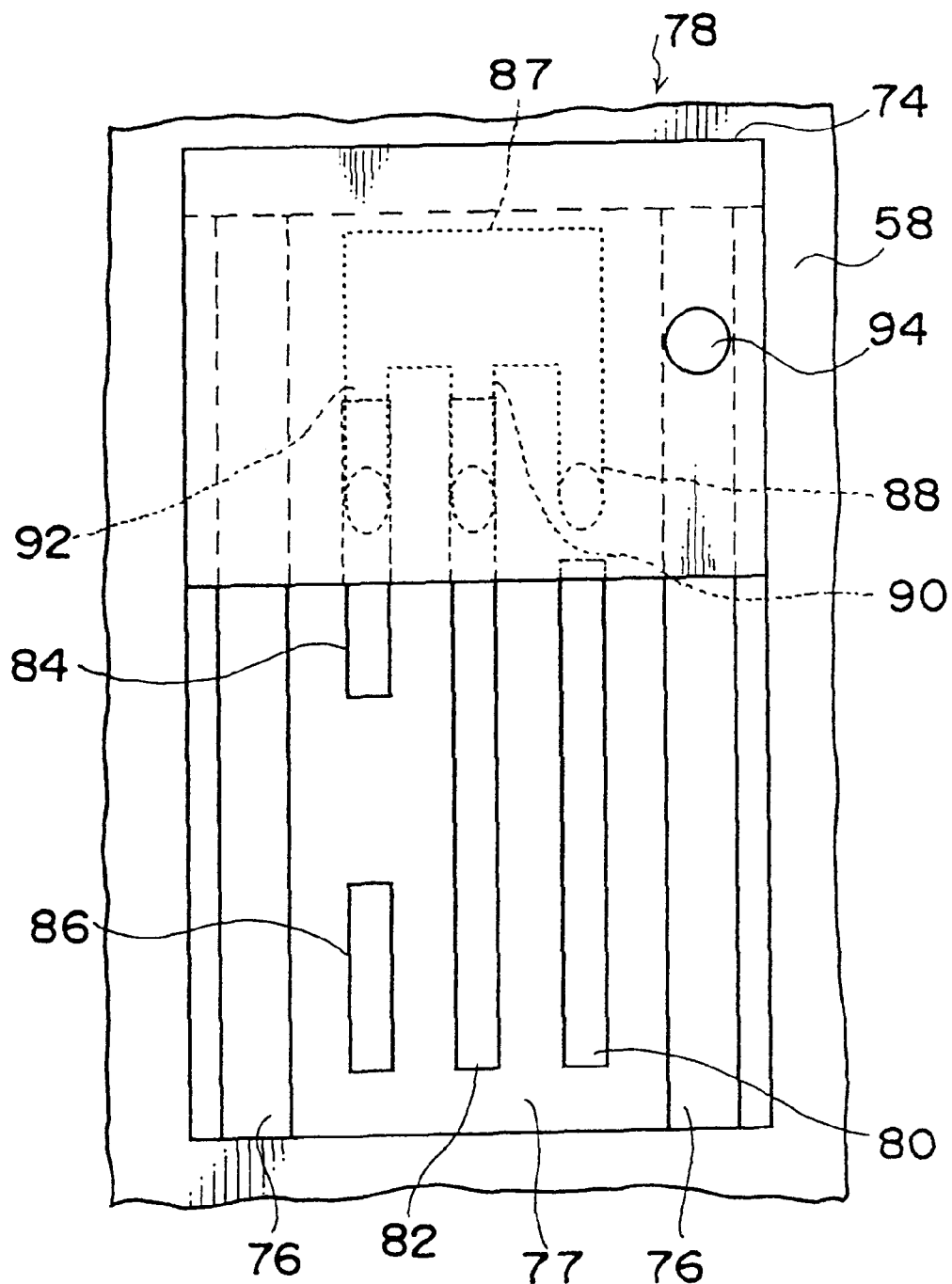
FIG. 10 is a view corresponding to FIG. 8 and illustrating a state in which the slider is positioned at a first detection position.

The slider 74, positioned at a "reference position" (shown in FIG. 8) in which the fixed contact 80 slide-contacts the slide contact 88 and the fixed contact 82 slide-contacts the slide contact 90, slides upward as the shift lock plate 62 slides upward. The slider 74 moves to a state (shown in FIG. 9) in which the fixed contacts 80 and 82 slide contact the slide contacts 88 and 90 respectively, and the fixed contact 84 slide-contacts the slide contact 92. Then the slider 74 moves to a "first detection position" (shown in FIG. 10) in which the slide contact 88 moves above the fixed contact 80 such that the contact state of the slide contact 88 and the fixed contact 80 is released, and the fixed contacts 82 and 84 slide-contact the slide contacts 90 and 92 respectively.

A controller such as a control circuit, a computer or the like detects that only the fixed contacts 82 and 84 are conducting, via the slide contact 90, the connecting portion 87 and the slide contact 92. Thus, the controller identifies that the shift lever 22 is in the P position.

As described above, if the shift lever 22 starts to be shift-operated from the P position to the R position with the detent pins 46 positioned at the upper end sides of the elongated holes 44, the detent pin 46 abuts the restricting portion 50 and shift operation of the shift lever 22 is restricted by the restricting portion 50. Thus, the knob button 42 must be pressed such that the detent pins 46 move downward toward the lower ends of the elongated holes 44.

When the other detent pin 46 at the supporting wall 16 side is moved downward, the detent pin 46 presses the inner wall of the cutout portion 64 at a lower side thereof. Thus, the shift lock plate 62 slides downward together with the detent pin 46. When the shift lock plate 62 starts to move downward in this state, the shift lock plate 62 presses the tilted surface formed at the distal end portion of the plunger 68 to press the plunger such that the plunger 68 is forcibly removed from the locus of slide movement of the shift lock plate 62. However, because the stopper 70 is positioned on the locus of slide movement of the shift lock plate 62 below the plunger 68, the slide movement of the shift lock plate 62 is restricted by the stopper 70. Thus, in this state, downward movement of the other detent pin 46, at the supporting wall 16 side, is restricted by the inner wall of the cutout portion 64 at the lower side thereof. Thus, the one detent pin 46, at the detent wall 14 side, cannot move lower than the restricting portion 50 and the shift restriction of the restricting portion 50 is not removed. In this state, shift operation of the shift lever 22 from the P position, i.e., changing to a shift range other than the parking range, is restricted (the P shift lock state).

In the above-described state, if the controller detects that a predetermined operation, such as a brake pedal being applied or the like, is carried out, electricity is supplied to excite the electromagnetic solenoid within the housing 58. The plunger 68 is engaged by a magnetic force such that the plunger 68 is substantially integrated with the electromagnetic solenoid. If the knob button 42 is pressed in the above-described state to move downward the shift lock plate 62 via the detent pin 46 such that the plunger 68 enters into the housing 58, and the stopper 70, which is substantially integrated with the plunger 68 via the electromagnetic solenoid, is pressed into the housing 58 with the plunger 68. Thus, the stopper 70 is removed from the locus of slide movement of the shift lock plate 62. In this way, sliding restriction of the shift lock plate 62 by the stopper 70 is removed. In the above-described state, the detent pins 46 can be moved downward by pressing the knob button 42 and shift operation from the P position to the R position is possible (the P shift unlock state).

Figure 5:
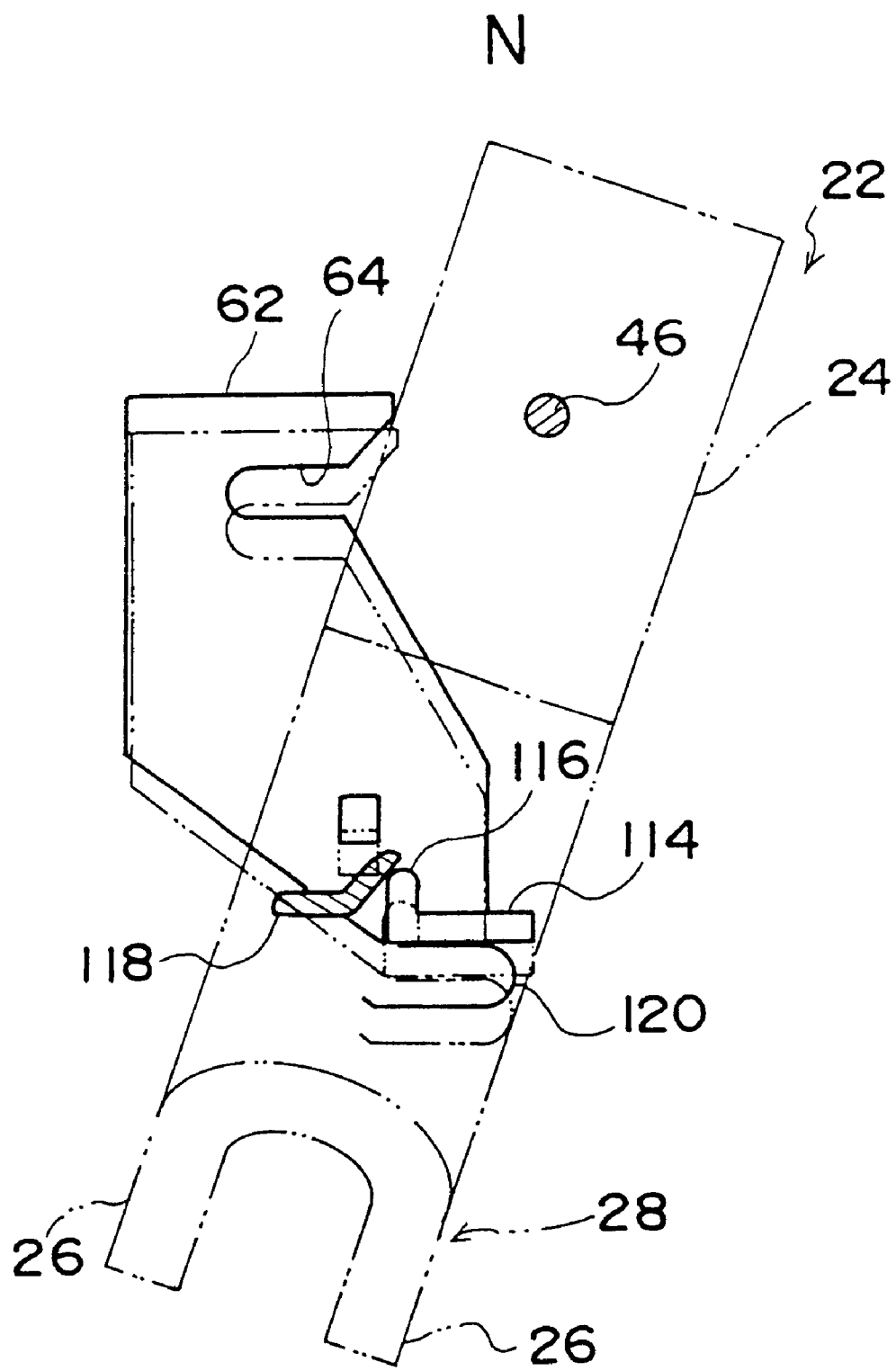
FIG. 5 is a schematic view corresponding to FIG. 4 and illustrating a positional relationship between the shift lever and the shift lock plate in a state in which the shift lever is positioned at an "N" position.

If the shift lever 22 is shift-operated from the P position to the N position via the R position, as illustrated in FIG. 5, the press cam 118 formed at the lever main body 24 rotates with the lever main body 24 to abut the convex portion 116 of the pressed block 114.

Figure 6:
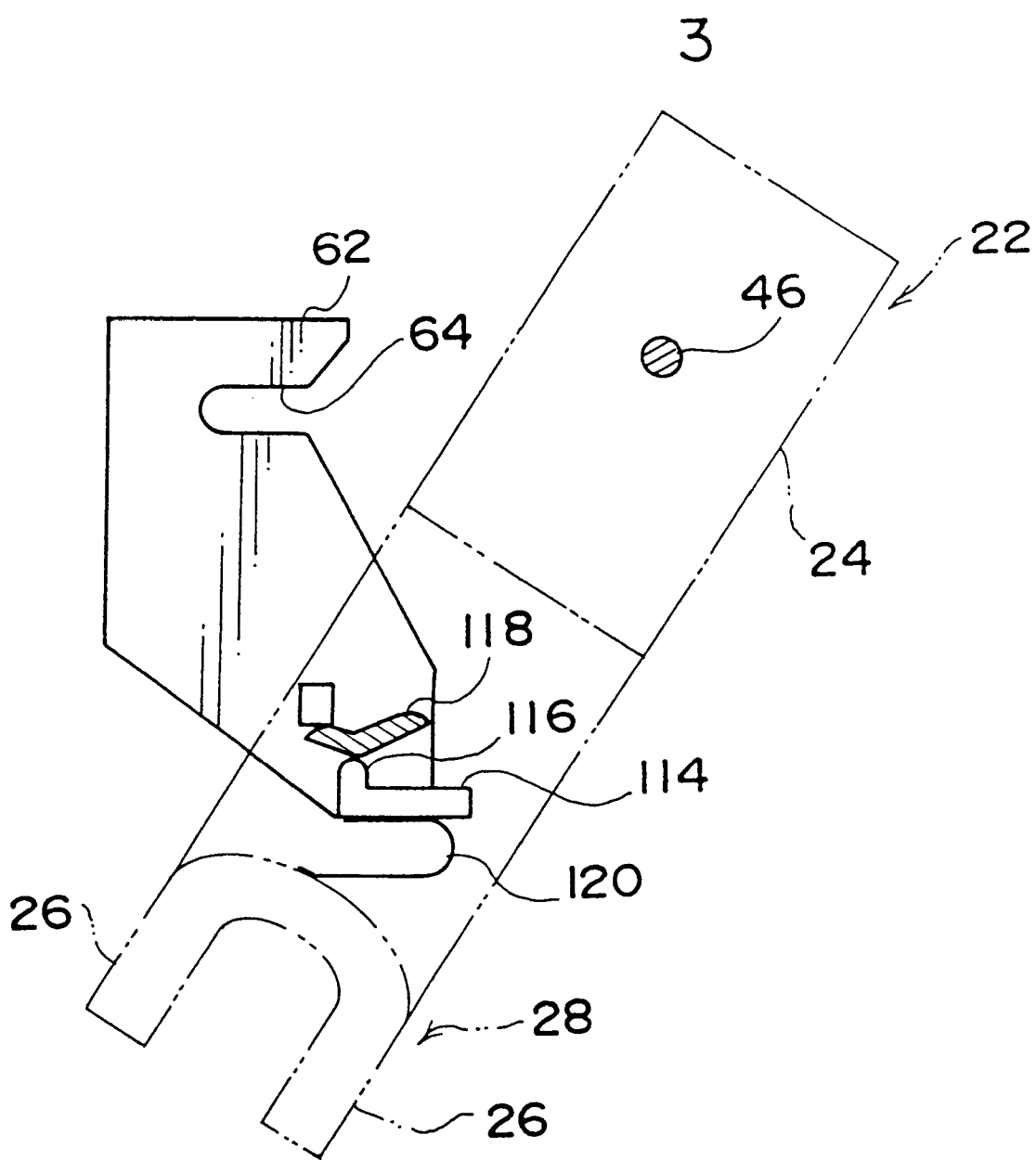
FIG. 6 is a schematic view corresponding to FIG. 4 and illustrating a positional relationship between the shift lever and the shift lock plate in a state in which the shift lever is positioned at a "3" position.

When the shift lever 22 is shift-operated from the N position to the 3 position, as illustrated in FIG. 6, the press cam 118 rotates in accordance with the rotation of the lever main body 24 such that the press cam 118 presses the convex portion 116 of the pressed block 114 downward. The pressed block 114 receives pressing force from the press cam 118. Thus, the shift lock plate 62 slides downward and the slider 74 also moves downward, to a position which is slightly lower than the reference position.

As illustrated in FIG. 6, when the shift lock plate 62 is pressed downward by the press cam 118, the plate spring 120 abuts the mounting portion 28 of the lever main body 24.

Next, when the shift lever 22 is shift-operated to the 2 position, the shift range of the automatic transmission is changed to the second range. As described above, the restricting portion 54 is positioned on the locus of rotation of the one detent pin 46 at the detent wall 14 side when the shift lever 22 is shift-operated from the 3 position to the 2 position. As in the case of the restricting portion 50, the shift lever 22 cannot be shift-operated to the "2 position" without the knob button 42 being pressed to move the detent pins 46 downward When the shift lever 22 is shift-operated from the 3 position to the 2 position with the detent pins 46 moved downward, the press cam 118 provided at the lever main body 24 further presses the convex portion 116 of the pressed block 114 downward and moves the shift lock plate 62 and the slider 74 further downward.

When the shift lever 22 is shift-operated to the 2 position, a lower end portion of the restricting portion 54 faces the detent pin 46 along the direction in which the detent pins 46 vertically move along the elongated holes 44. Thus, in the above-described state, as illustrated in FIG. 7, even when the pressing force on the knob button 42 is released, the one detent pin 46 at the detent wall 14 side abuts the lower end portion of the restricting portion 54 and the detent pins 46 do not return to the upper end, of the elongated holes 44 but stay at a longitudinal direction intermediate portion of the elongated hole 44.

If the shift lever 22 is then select-operated substantially in the vehicle left-hand direction along the select hole 36, from a state in which the shift lever 22 is shift-operated to the "2 position" such that the shift range of the automatic transmission is changed to the second range to the L position, the shift range of the automatic transmission can be changed to the low range.

Figure 7:
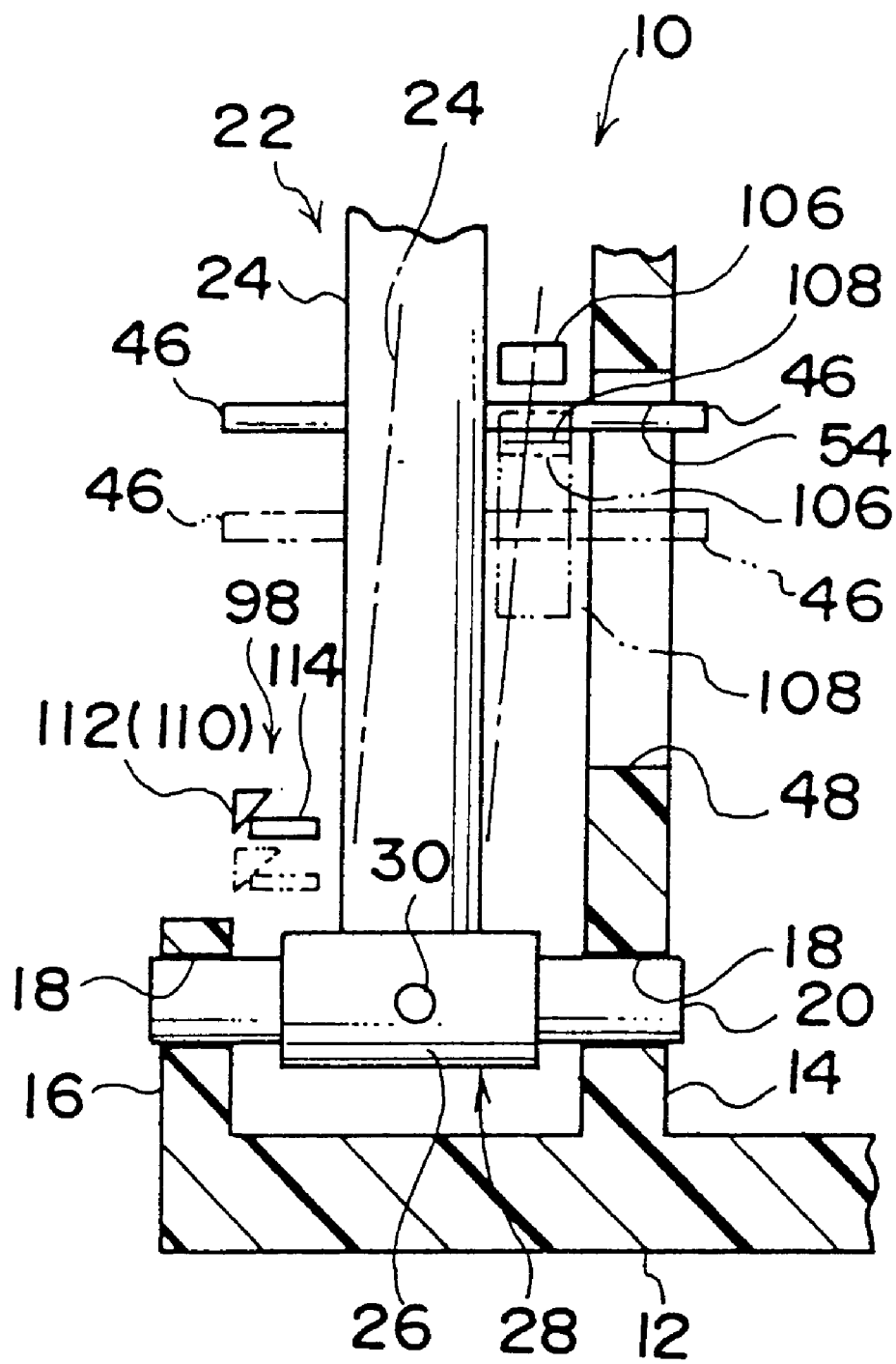
FIG. 7 is a view illustrating positions of detent pins and the like in a state in which the shift lever is positioned at a "2" position, and a position of a 2-L slider in a state in which the detent pins are moved downward.

When the shift lever 22 is positioned at the 2 position, as illustrated in FIG. 7, the restricting portion 106 of the restricting lever 104 is interposed between the detent wall 14, which is substantially at the vehicle left-hand side of the lever main body 24, and the lever main body 24. If the shift lever 22 starts to be select-operated in this state, the restricting portion 106 abuts the lever main body 24 and the restricting portion 106 restricts the select operation of the shift lever 22. Therefore, the shift lever 22 cannot be moved to the L position. Thus, the shift range of the automatic transmission cannot be changed to the low range.

In this state, if the knob button 42 is pressed to move the detent pins 46 downward, the one detent pin 46 at the detent wall 14 side presses the releasing portion 108 of the restricting lever 104 downward. Thus, the 2-L slider 98 rotates about the shaft 103 such that the releasing portion 108 moves downward. In accordance with the releasing portion 108 being moved downward, the restricting portion 106, which is integrated with the releasing portion 108, is also moved downward. The restricting portion 106 faces the detent hole 48 substantially in the vehicle transverse direction. If the shift lever 22 is select-operated to the L position in this state, the restricting lever 104 is pressed toward the detent wall 14 by the lever main body 24 of the shift lever 22 and moves toward the detent wall 14 along the shaft 103 against an urging force of the compression coil spring 105. The restricting portion 106 enters within the detent hole 48. That is, the restriction of the select operation of the shift lever 22 by the restriction portion 106 is removed and the shift range of the automatic transmission can be changed to the low range by select-operation of the shift lever 22 to the L position.

Figure 11:
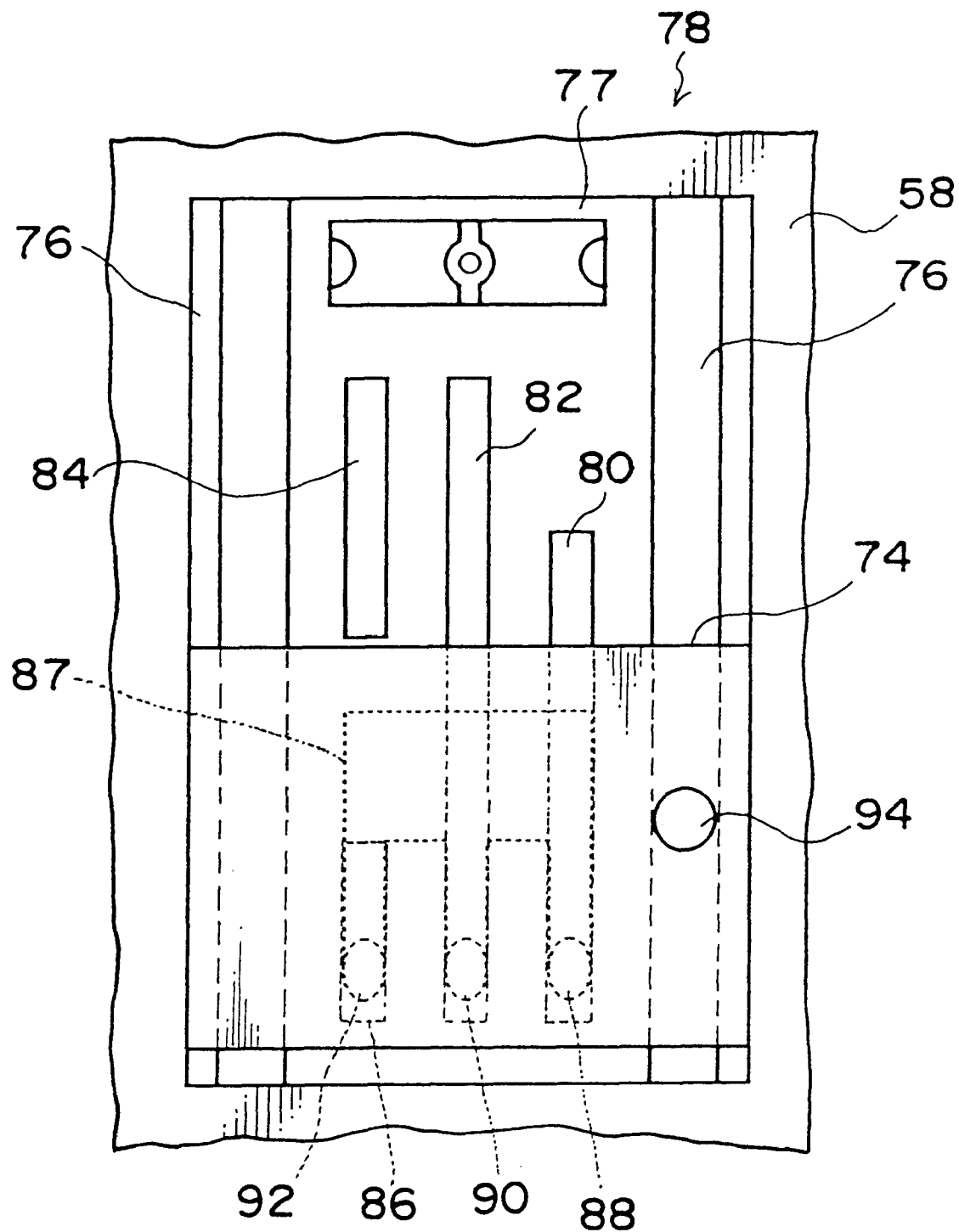
FIG. 11 is a view corresponding to FIG. 8 and illustrating a state in which the slider is positioned at the second detection position.

Further, in the state in which the shift lever 22 is positioned at the 2 position, the convex portion 116 is pressed by the press cam 118 such that the slider 74 is moved downward to a position which is lower than the reference position. Thus, the press receiving block 114 is positioned at the detent wall 14 side of the cam portion 112 formed at the operation lever 110. When the shift lever 22 is select-operated to the L position as described above, such that the restricting lever 104 is moved toward the detent wall 14, the operation lever 110, which is integrated with the restricting lever 104, moves toward the detent wall 14 such that the cam portion 112 contacts and presses the pressed block 114. The part of the cam portion 112 that contacts the pressed block 114 is a tilted surface which faces downward toward the detent wall 14 side. Therefore, the cam portion 112 presses the pressed block 114 downward. Therefore, the slider 74 is moved downward with the shift lock plate 62 to a "second detection position" (shown in FIG. 11). As illustrated in FIG. 11, in this state, the fixed contacts 80, 82 and 86 slide-contact the slide contacts 88, 90 and 92, respectively. The slide contact state of the fixed contacts 80, 82 and 86 and the slide contacts 88, 90 and 92 is different from that at the above described reference position or at the first detection position. Thus, a control circuit or computer which is the controller detects that the fixed contact 82 communicates with the fixed contact 80 via the slide contact 90, the connecting portion 87 and the slide contact 88, and communicates with the fixed contact 86 via the connecting portion 87 and the slide contact 92, and the controller recognizes that the shift lever 22 is at the L position.

As described above, in the first embodiment, the select operation of the shift lever 22 to the L position which is a third operation position is detected by the slider 74 which is a part of the shift lock plate 62 and the position detecting mechanism 78 for detecting that the shift lever 22 is positioned at the P position which is the "first operation position". Therefore, it is not necessary to specially provide a switch for detecting the select operation of the shift lever 22. As a result, costs are kept down.

Further, because the slider 74, which is a part of the shift lock plate 62 which forms a part of the shift lock mechanism, serves as the member for detecting the select operation, the device can be made compact.

Next, another embodiment will be described. Members which are the same as in the first embodiment are denoted by the same reference numerals and descriptions thereof will be omitted.

Structure of Second Embodiment

Figure 12:
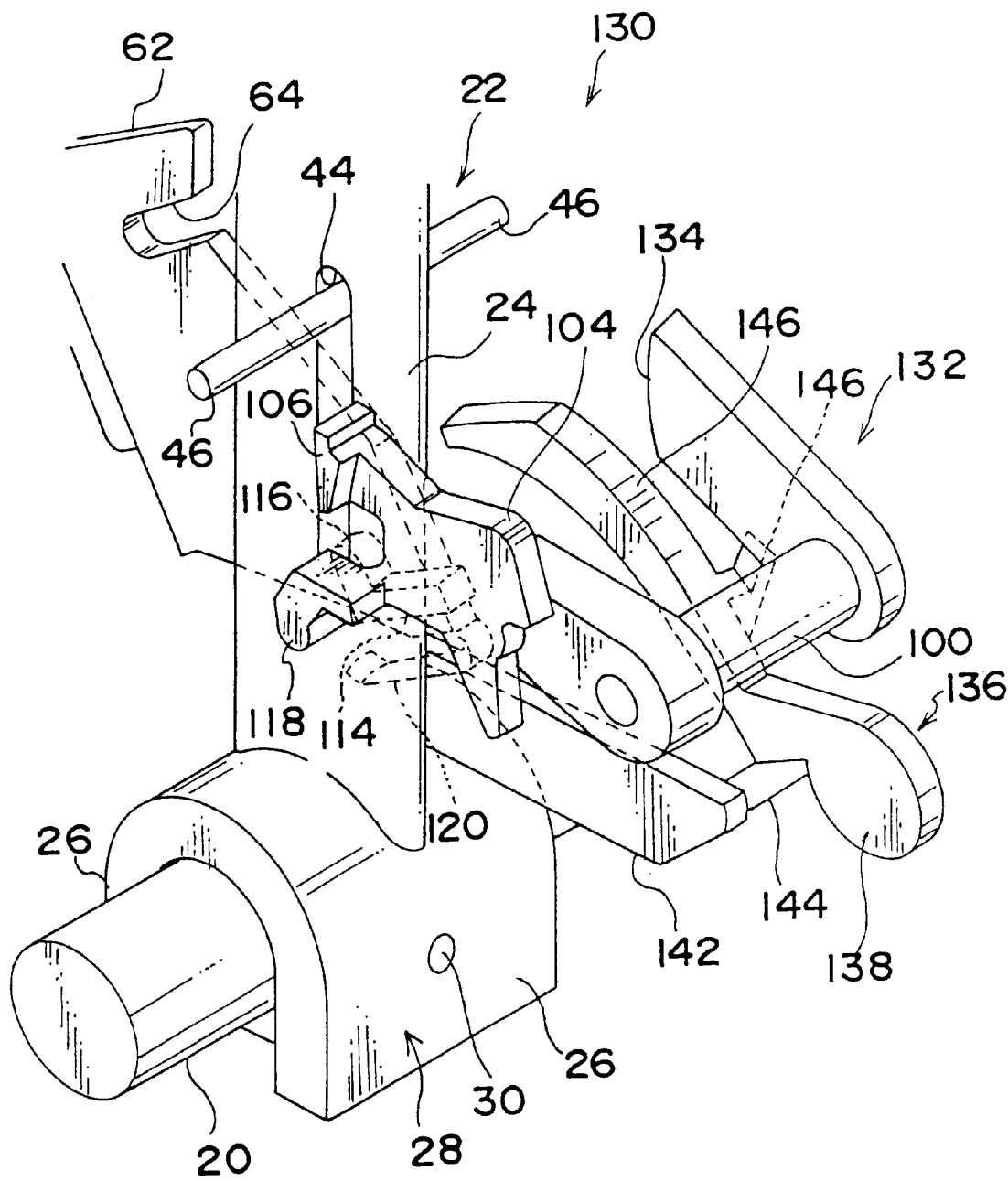
FIG. 12 is a perspective view of a schematic structure of an important portion of a shift lever device relating to a second embodiment of the present invention.
Figure 13:
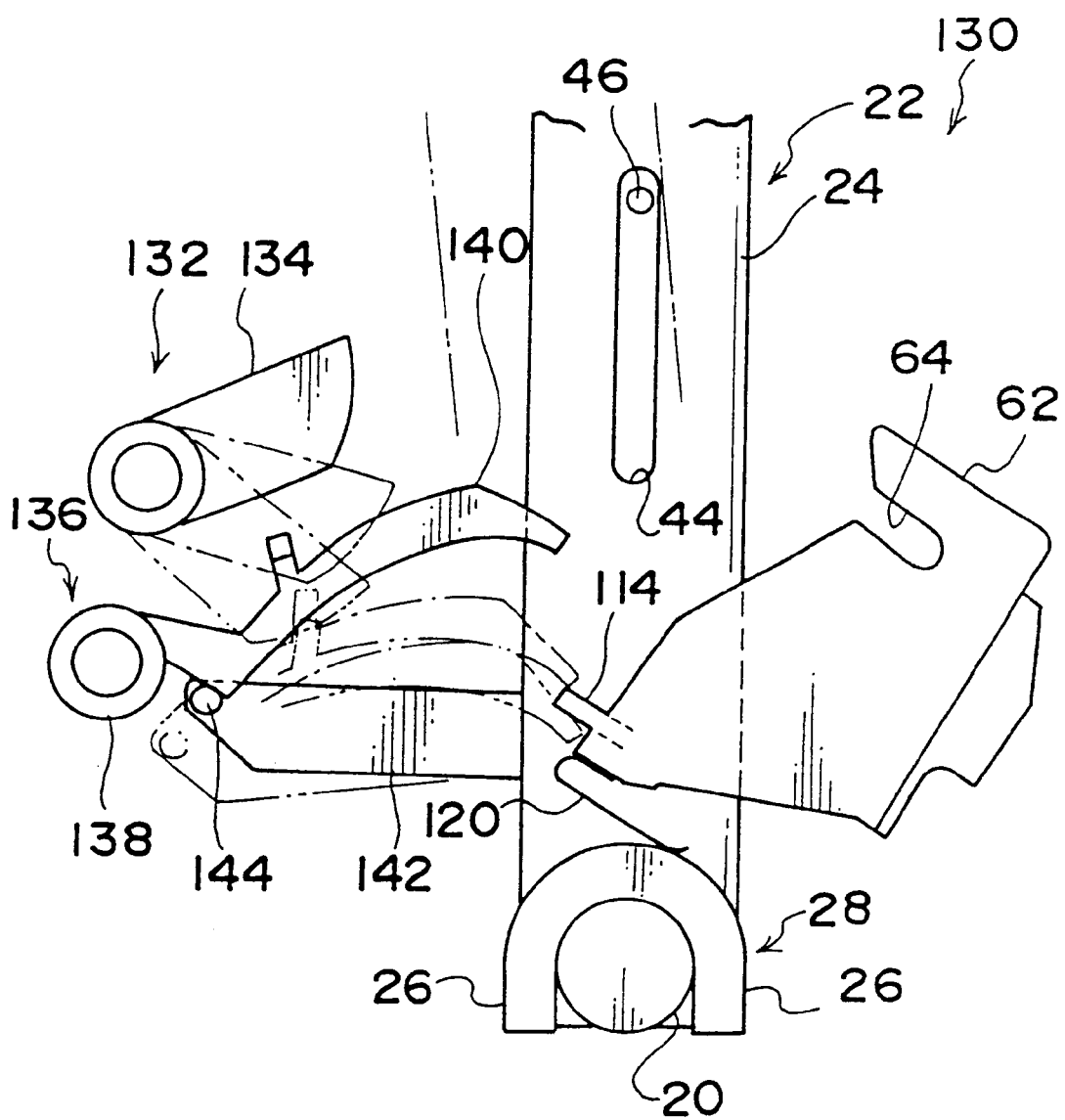
FIG. 13 is a view illustrating a positional relationship between a 2-L link which serves as a link member when the shift lever is positioned at the 3 position, the 2 position or an L position and a 2-L slider which serves as a slider operating member.

FIG. 12 shows a schematic perspective view of a shift lever device 130 relating to a second embodiment of the present invention. In FIGS. 12 and 13, the base 12, structural members of the shift lock unit 56 other than the shift lock plate 62, the detent wall 14, the supporting wall 16 and the like, which have been described in the first embodiment, are not shown. These members are not shown so as to more clearly represent the form of the second embodiment. In fact, the shift lever device 130 includes the structural members of the shift lock unit 56 other than the shift lock plate 62, the base 12, the detent wall 14, the supporting wall 16 and the like, as in the first embodiment.

As shown in FIG. 12, the shift lever device 130 includes a 2-L slider 132 which serves as a slider operating member which forms slider operating means. The 2-L slider 132 is basically the same as the 2-L slider 98 in the shift lever device 10 relating to the first embodiment, except for slight differences in shape. Here, the cam portion 112 is not formed at the operation lever 110.

The shift lever device 130 includes a 2-L link 136 which serves as a link member which forms the slider operating means. The 2-L link 136 has a mounting portion 138 and is rotatably supported by the supporting wall 16 about an axis whose direction is substantially the vehicle transverse direction and whose position is substantially at the vehicle downward side of the 2-L slider 132. A lever portion 140 extends substantially toward the vehicle front from outer circumferential portion of the mounting portion 138. The lever portion 140 is a curved plate whose thickness direction corresponds substantially to the vehicle transverse direction. The pressed block 114 of the shift lock plate 62 is positioned on a locus of a distal end portion of the lever portion 140 when the lever portion 140 rotates about the axis whose direction is substantially the vehicle transverse direction. A pressed portion 146 protrude substantially in the vehicle right-hand direction from a longitudinal direction intermediate portion of the lever portion 140. The press receiving portion 146 is disposed at the detent wall 14 side of the operation lever 110 when the lever portion 140 is at a predetermined position of rotation (i.e., the distal end portion of the lever portion 140 is pivoted downward). An upper end portion of the pressed portion 146 is a tilted surface tilted toward the supporting wall 16 side.

Further, as illustrated in FIG. 12, the shift lever device 130 includes a holding lever 142. A proximal end portion of the holding lever 142 is fixed to the lever main body 24 and a distal end of the same substantially intersects the longitudinal direction of the lever main body 24 to extend substantially to the vehicle rearward direction. A pin 144 is formed at the distal end portion of the holding lever 142 to protrude to the supporting wall 16 side thereof (see FIG. 1). As illustrated in FIG. 12, the pin 144 is positioned on the locus of rotation of the lever portion 140. When the lever main body 24 (the shift lever 22) is positioned substantially toward the vehicle front from the 3 position (i.e., when the shift lever 22 is positioned between the P position and the 3 position), the pin 144 abuts a side portion of the lever portion 140 and thereby supports the lever portion 140.

In the shift lever device 130 having the above-described structure, as shown in FIG. 13, if the lever main body 24 (the shift lever 22) is shift-operated from the 3 position to the 2 position (i.e., the lever main body 24 is shift-operated from a position shown by solid lines to a position shown by dashed lines in FIG. 13), before the lever main body 24 reaches the 2 position, the distal end portion of the lever portion 140 abuts the upper surface of the pressed block 114 of the shift lock plate 62 such that the lever portion 140 is supported by the pressed block 114. Thus, when the shift operation is carried out until the lever main body 24 reaches the 2 position, the pin 144 is positioned downward from the side portion of the lever 140 and therefore, does not support the lever portion 140.

When the lever main body 24 (the shift lever 22) is positioned at the 3 position, the operation lever 110 of the 2-L slider 132 is disposed at a position shown by solid lines in FIG. 13. If the knob button 42 is pressed to move the detent pins 46 downward so as to avoid the restricting portion 54 when the shift lever 22 is shift-operated to the 2 position, the one detent pin 46 at the detent wall 14 side presses the releasing portion 108 to rotate and move the 2-L slider 132 to a position shown by dashed lines in FIG. 13. In this state, the operation lever 110 formed at the 2-L slider 132 is disposed at the right side of the pressed portion 146 formed at the 2-L link 136, i.e., at the supporting wall 16 side.

Then, if the lever main body 24 (the shift lever 22) is select-operated to the L position, the restricting lever 104 is pressed toward the detent wall 14 by the lever main body 24 and moved toward the detent wall 14 along the shaft 103 against the urging force of the compression coil spring 105. Thus, the operation lever 110 presses the pressed portion 146 of the 2-L link 136. As described above, the upper end portion of the pressed portion 146 is a tilted surface which faces the supporting wall 16 side. Therefore, the 2-L link 136 is pivoted downward about the proximal end portion thereof by the upper end portion of the pressed portion 146 receiving a pressing force toward the detent wall 14 side. The distal end portion of the pivoted 2-L link 136 presses the pressed block 114 to move the shift lock plate 62 downward. Accordingly, as in the first embodiment, the slider 74 is moved downward with the shift lock plate 62. The slider 74 moves with the shift lock plate 62 to the second detection position such that the slide contacts 88 and 92 contact and communicate with the fixed contacts 80 and 86, respectively. As a result, select operation of the shift lever 22 to the L position is detected.

Here, an amount of displacement in the pivot direction of the pivoted 2-L link 136 at the distal end is larger than the same at the proximal end side. Accordingly, even though displacement at the proximal end of the 2-L link 136 due to pressing at the pressed portion 146 is small, displacement of the distal end of the 2-L link 136 is substantially larger than displacement of the pressed portion 146. Thus, it is possible to move the shift lock plate 62 a longer distance than in a case in which the shift lock plate 62 is directly pressed and moved by the 2-L slider 136. Thus, in the shift lever device 130, switching of slide contact states of the slide contacts 88, 90 and 92 and the fixed contacts 80, 82, 84 and 86 can be more definitely carried out. Thus, it is possible to reliably detect that the shift lever 22 has been select-operated from the 2 position to the L position.

As described above, in accordance with the shift lever device of the present invention, it is possible to reliably detect when the select operation has been carried out. Further, because no special switch is used, costs are kept down.

What is claimed is:

1. A shift lever device for use with a transmission for selecting a transmission shift range, the device comprising:

a slider which is moved from a reference position to a first detection position by one of a shift operation of the shift lever to a first operation position which is at an one end portion of a range of shift operation of the shift lever, which the one end portion is opposite an other end portion of the range of shift operation, at which the other end portion the range of shift operation communicates with a range of select operation, and a shift lever action at the first operation position;

a slider operating device moving to a position one of whereas the slider operating device can abut the slider or the slider operating device abuts the slider, by one of a shift operation of the shift lever to a second operation position, which is at a side of the other end portion from the first operation portion of the range of shift operation, and a shift lever action at the second operating position, and, causing to move the slider via the reference position to a second detection position, by one of a select operation of the shift lever to a third operation position which is at an end portion of the range of select operation, which end portion is at a side of the range of select operation opposite to a side thereof at which the range of select operation communicated with the range of shift operation, and a shift lever action in accordance with the select operation; and a slider position detection device which detects movement of the slider to the reference positions, the first detection position and the second detection position;

wherein the reference position is positioned between the first detection position and the second detection position.

2. The shift lever device according to claim 1, further comprising:

a detent member which moves with the shift lever in accordance with the shift operation and the select operation of the shift lever, which is displaced relative to the shift lever from a restriction position to a restriction releasing position in a longitudinal direction of the shift lever by a predetermined releasing operation, and which engages with the slider one of directly or indirectly in a state in which the shift lever is positioned at the first operation position so as to move the slider from the reference position to the first detection position in accordance with a movement of the detent member from the restriction releasing position to the restriction position;

a restricting portion, in a state in which the shift lever is positioned at the first operation position and the detent member is positioned at the restriction position, opposing the detent member along a direction of the shift operation from the first operation position, and which does not oppose the detent member when the detent member is at the restriction releasing position; and a shift lock device which is provided on a locus of movement of the slider from the first detection position to the reference position, and which restricts a movement of the slider from the first detection position to the reference position, and which is removed from the locus of movement of the slider under predetermined releasing conditions.

3. The shift lever device according to claim 1, wherein the slider operating device further comprises:

a slider operating member which is moved in a direction of the select operation by being pressed by the shift lever during the select operation, and which, in accordance with movement in the direction of the select operation direction, applies a pressing force to the slider one of directly or indirectly to thereby move the slider to the second detection position.

4. The shift lever device according to claim 3, wherein the slide operating device further comprises:

a link member provided such that a distal end portion thereof corresponds to the slider and a proximal end vicinity portion thereof corresponds to the slider operating member, and which is pivoted about a proximal end portion of the link member by a pressing force applied to the slider operating member and which thereby presses the slider with the distal end portion to thereby move the slider to the second detection position.

* * * * *